United States Patent
Kumar et al.

(10) Patent No.: US 11,935,522 B2
(45) Date of Patent: Mar. 19, 2024

(54) COGNITIVE ANALYSIS OF PUBLIC COMMUNICATIONS

(71) Applicant: Capital One Services, LLC, McLean, VA (US)

(72) Inventors: Lokesh Vijay Kumar, Frisco, TX (US); Poornima Bagare Raju, Frisco, TX (US); Rhic Chowdhury, Bengaluru (IN); Nimish Mangal, Uttar Pradesh (IN); Jacob Adair, Frisco, TX (US); Chris Demchalk, Frisco, TX (US); Lavika Aggarwal, Sonipat (IN); Nishant Sinha, Bangalore (IN)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/745,130

(22) Filed: May 16, 2022

(65) Prior Publication Data

US 2022/0277739 A1    Sep. 1, 2022

Related U.S. Application Data

(63) Continuation of application No. 16/899,003, filed on Jun. 11, 2020, now Pat. No. 11,335,336.

(51) Int. Cl.
*G10L 15/00*    (2013.01)
*G06F 16/93*    (2019.01)
(Continued)

(52) U.S. Cl.
CPC .......... *G10L 15/1822* (2013.01); *G06F 16/93* (2019.01); *G06N 20/00* (2019.01);
(Continued)

(58) Field of Classification Search
CPC ..... G10L 15/1822; G10L 15/26; H04L 51/52; H04L 51/224; G06F 16/93;
(Continued)

(56) References Cited

U.S. PATENT DOCUMENTS 7,389,265 B2    6/2008  Lawrence et al.
7,716,077 B1    5/2010  Mikurak
(Continued)

OTHER PUBLICATIONS

Crook, Jonathan N., David B. Edelman, and Lyn C. Thomas. "Recent developments in consumer credit risk assessment." European Journal of Operational Research 183.3 (2007): 1447-1465. (Year: 2007).
(Continued)

*Primary Examiner* — Md S Elahee
(74) *Attorney, Agent, or Firm* — Sterne, Kessler, Goldstein & Fox P.L.L.C.

(57) ABSTRACT

Disclosed herein are system, method, and computer program product embodiments for categorizing customer complaints on social media using a model trained on customer voice calls or chats with agents. Additionally, users interested in monitoring regulatory compliance issues based on customer complaints can receive notifications regarding complaints that are linked to regulatory topic areas, without the need to manually scan vast numbers of social media postings.

18 Claims, 7 Drawing Sheets

(51) Int. Cl.
| | |
|---|---|
| *G06N 20/00* | (2019.01) |
| *G06Q 30/016* | (2023.01) |
| *G06Q 50/00* | (2012.01) |
| *G10L 15/18* | (2013.01) |
| *G10L 15/26* | (2006.01) |
| *H04L 51/52* | (2022.01) |
| *H04M 3/42* | (2006.01) |
| *H04M 3/51* | (2006.01) |

(52) U.S. Cl.
CPC ........... *G06Q 30/016* (2013.01); *G06Q 50/01* (2013.01); *G10L 15/26* (2013.01); *H04L 51/52* (2022.05); *H04M 3/42221* (2013.01); *H04M 3/5175* (2013.01)

(58) Field of Classification Search
CPC .......... G06F 21/6245; H04M 3/42221; H04M 3/5175; H04M 2203/401; G06Q 50/01; G06Q 20/3678; G06Q 30/016
USPC ........................................................ 704/235
See application file for complete search history.

(56) References Cited

U.S. PATENT DOCUMENTS

| | | | |
|---|---|---|---|
| 8,204,879 | B2 | 6/2012 | Doyle |
| 8,887,286 | B2 | 11/2014 | Dupont et al. |
| 9,262,517 | B2 | 2/2016 | Feng et al. |
| 9,633,403 | B2 | 4/2017 | Mohanty et al. |
| 9,721,229 | B1 | 8/2017 | Hernandez et al. |
| 9,824,321 | B2 | 11/2017 | Raghunathan et al. |
| 9,836,599 | B2 | 12/2017 | Sheldon et al. |
| 10,269,372 | B1 | 4/2019 | Fiedler et al. |
| 10,289,678 | B2 | 5/2019 | Parikh et al. |
| 10,367,942 | B2 | 7/2019 | Klein et al. |
| 10,410,136 | B2 | 9/2019 | Zhang et al. |
| 10,417,350 | B1 | 9/2019 | Mohamed et al. |
| 10,467,717 | B2 | 11/2019 | Cai et al. |
| 10,530,930 | B2 | 1/2020 | St-Cyr et al. |
| 10,867,268 | B1 | 12/2020 | Kumar et al. |
| 2002/0138371 | A1 | 9/2002 | Lawrence et al. |
| 2002/0143562 | A1 | 10/2002 | Lawrence |
| 2003/0233278 | A1 | 12/2003 | Marshall |
| 2004/0243588 | A1 | 12/2004 | Tanner et al. |
| 2008/0319922 | A1 | 12/2008 | Lawrence et al. |
| 2010/0076962 | A1 | 3/2010 | Doyle |
| 2010/0100427 | A1 | 4/2010 | McKeown et al. |
| 2010/0205014 | A1 | 8/2010 | Sholer et al. |
| 2012/0137367 | A1 | 5/2012 | Dupont et al. |
| 2012/0316916 | A1 | 12/2012 | Andrews et al. |
| 2013/0232156 | A1 | 9/2013 | Dunn et al. |
| 2016/0063277 | A1* | 3/2016 | Vu ..................... G06F 21/6245 726/4 |
| 2016/0359915 | A1 | 12/2016 | Gupta et al. |
| 2017/0019291 | A1 | 1/2017 | Tapia et al. |
| 2017/0075978 | A1 | 3/2017 | Zhang et al. |
| 2017/0076225 | A1 | 3/2017 | Zhang et al. |
| 2017/0098169 | A1 | 4/2017 | Gupta et al. |
| 2017/0255700 | A1 | 9/2017 | Shiffman et al. |
| 2017/0300472 | A1 | 10/2017 | Parikh et al. |
| 2017/0372038 | A1 | 10/2017 | Gupta et al. |
| 2018/0027006 | A1 | 1/2018 | Zimmermann et al. |
| 2018/0053128 | A1 | 2/2018 | Costas |
| 2018/0060416 | A1* | 3/2018 | Bastide ................. G06Q 50/01 |
| 2018/0174446 | A1 | 6/2018 | Wang |
| 2019/0121808 | A1 | 4/2019 | Chadha et al. |
| 2019/0220512 | A1 | 7/2019 | Parikh et al. |
| 2020/0304364 | A1 | 9/2020 | Tapia et al. |
| 2020/0387570 | A1 | 12/2020 | Biswas et al. |
| 2021/0174277 | A1 | 6/2021 | Kumar et al. |
| 2021/0192292 | A1 | 6/2021 | Zhai |
| 2021/0390950 | A1 | 12/2021 | Kumar et al. |

OTHER PUBLICATIONS

Del Prette, Zilda Aparecida Pereira, et al. "Role of social performance in predicting learning problems: Prediction of risk using logistic regression analysis." School Psychology International 33.6 (2012): 615-630. (Year: 2012).

Ganguly, Saptarshi, et al. "Digital risk: Transforming risk management for the 2020s." Mc Kinsey Insights (2017). (Year: 2017).

\* cited by examiner

COGNITIVE ANALYSIS OF PUBLIC COMMUNICATIONS

CROSS-REFERENCE TO RELATED APPLICATIONS

This application is a continuation of U.S. patent application Ser. No. 16/899,003, filed Jun. 11, 2020, which is incorporated by reference herein in its entirety.

BACKGROUND

While the internet has provided customers with many opportunities to voice their opinions regarding companies and their products, these opinions are largely decentralized and found across many social media platforms and other venues. There is a significant risk that customers of a business may voice problematic complaints on a platform that the business does not routinely monitor, or cannot fully monitor.

While businesses can maintain a social media presence that customers can directly interact with, it is increasingly difficult for any individual to monitor the full scale of customer complaints, even on those platforms that a business regularly interacts with.

For this reason, it is desirable to provide approaches to simplify identification of and access to relevant customer complaints.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Businesses in many industries need to deal with risks associated with regulatory enforcements. In order to assess risks and mitigate harm as effectively as possible, these businesses need to quickly identify problem areas where there is a risk of regulatory enforcement being taken against them. Provided herein are system, apparatus, device, method and/or computer program product embodiments, and/or combinations and sub-combinations thereof, for rapid identification and access to customer complaints (or positive feedback) across public forums.

In the highly-regulated banking industry, for example, it is useful to track customer complaints as a metric for compliance with certain regulatory provisions. If customer complaints implicate a particular regulatory mandate that is not being satisfied, the regulated business may take remedial action quickly.

In a traditional customer complaints model, a customer directly reaches out to the company to lodge a complaint. In a non-limiting example, the customer may contact the company by a telephone call, and speak with an agent. In another non-limiting example, the customer may initiate a chat session with the agent on the company's website.

However, increasingly more commonly, customers lodge complaints indirectly on online public forums (i.e., social media platforms). Companies may have a presence on these social media platforms that allow for the customers to directly engage with the company, typically through either direct messaging or @-mentioning (or similar tagging mechanism), which alerts the company to the customer's interaction and allows an agent to respond to the customer through the social media platform, either on a private channel (e.g., direct messages) or a public channel (e.g., tagging the customer in a public reply).

With customer complaints being lodged on social media platforms instead of directly with companies on platforms that they control, it becomes a challenge for companies to collect the complaints and bring them in-house. By way of non-limiting example, companies employ, directly or contracted out, a scraping service to collect social media postings that reference the company. The scraping service may collect any posting that references the company across social media platforms, and deliver the postings to a system for processing.

The amount of material scraped in this manner is vast. Categorizing it in terms of actionable complaints categories is therefore a monumental task.

Figure 1:
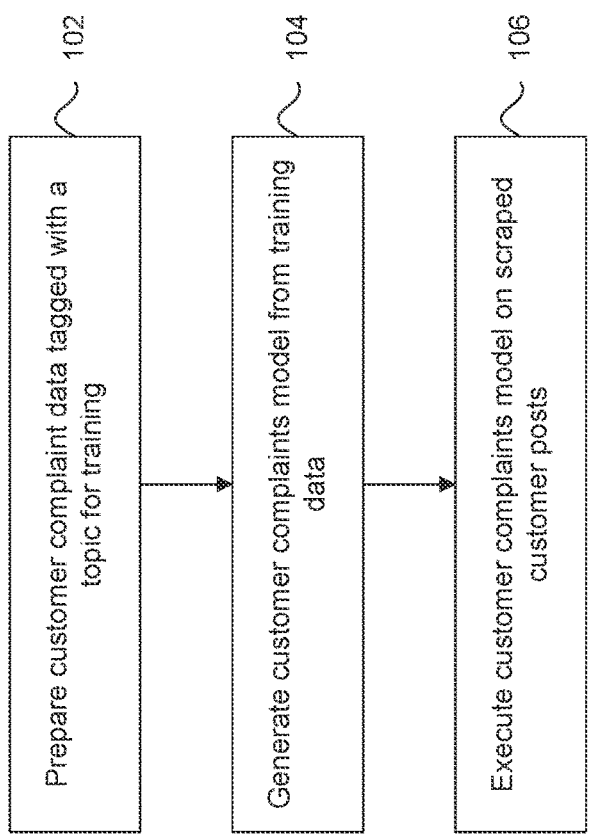
FIG. 1 is a flowchart illustrating steps by which scraped customer social media posts can be categorized, in accordance with an embodiment.

FIG. 1 is a flowchart 100 illustrating steps by which scraped customer social media posts can be categorized, in accordance with an embodiment. At step 102, customer complaint data, tagged with associated topics, is prepared for training. Typically, this customer complaint data can be sourced from existing systems under a business' control, such as a complaints phone line or chat. These types of systems are routinely monitored and recorded. In accordance with an embodiment, the complaint can be associated with a topic (or category) by tagging the complaint.

At step 104, a machine learning (ML) model is trained using the customer complaint data tagged with the associated topics through supervised learning. Some non-limiting examples of supervised learning models include, for example and without limitation, nearest neighbor, naïve Bayes, decision trees, support vector machines, neural networks, or any machine learning algorithm suitable for classification problems. By training this customer complaints model accordingly, it can be used to automatically determine a topic (and, in embodiments, subtopics—included herein whenever topics are referenced) that should be tagged to any given customer complaint. As a result, at step 106, the customer complaints model is executed on the scraped customer postings from social media, in order to tag the postings according to the various topics trained into the customer complaints model.

By this approach, it is possible to leverage large amounts of training data from existing call-in and chat sessions between customers and agents to automatically tag vast amounts of social media postings. With these postings tagged appropriately, they can be quickly searched and cataloged to identify risks to a business. Alternatively, the concepts herein can also be applied to positive feedback to allow business to improve even further on what they are doing well.

Figure 2:
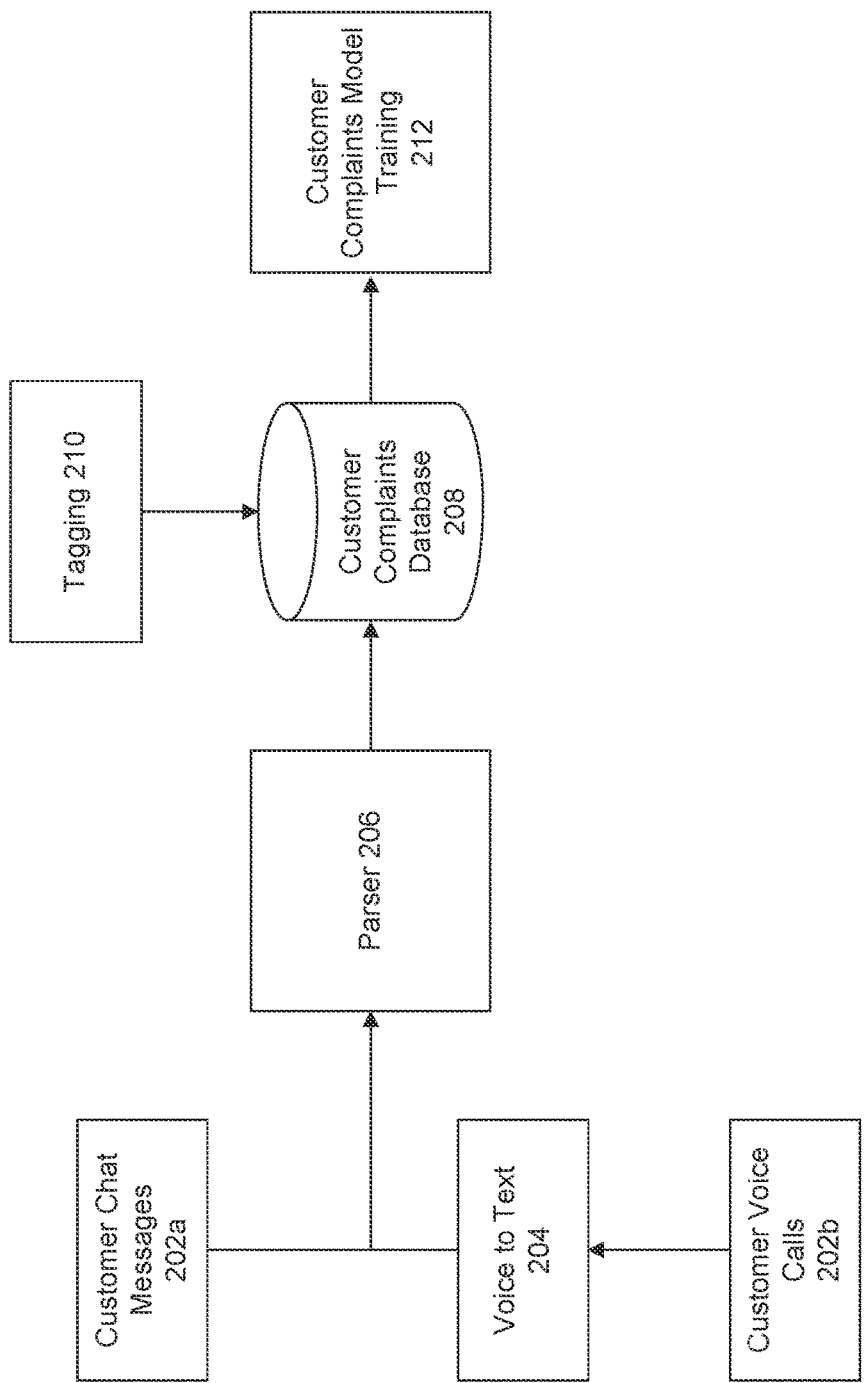
FIG. 2 is an architecture for a customer complaints model training system, in accordance with an embodiment.

FIG. 2 is an architecture for a customer complaints model training system 200, in accordance with an embodiment. The system uses existing logs for training purposes, such as customer chat messages 202a or customer voice calls 202b. In the case of voice calls 202b, these are first converted to text by voice to text component 204. In either event, the result is a transcript of the call or chat, provided to parser 206.

Parser 206 is configured to parse the provided transcript as needed. For example, in accordance with an embodiment, parser 206 identifies participants in the call from the transcript and separates their text. For example, a typical call or chat will involve two parties—the calling or messaging customer, and an agent. Parser 206 can, in certain use cases, identify text corresponding to the customer, and text corresponding to the agent, and discard the agent portion of the text. In other use cases (such as when looking for risks stemming from agent behaviors), the customer portion of the transcript may be discarded instead.

The transcript (e.g., the customer-side of the transcript) is stored in customer complaints database 208, in accordance with an embodiment. One skilled in the relevant arts will appreciate that customer complaints database 208 may be any usable storage implementation, including a relational database or a flat file by way of example.

Transcripts stored in customer complaints database 208 are tagged by tagging component 210, in accordance with an embodiment. Tagging 210 may be performed by a variety of mechanisms, including automatic and manual approaches. For example, in an embodiment, if a customer initiates a voice call to a business, they may be presented initially with a phone tree of options. This phone tree may have options associated with topics corresponding to the purpose of the call, as well as to tags used for categorizing the transcript by tagging component 210. In this case, tags may be automatically associated with the transcripts by tagging component 210 based on the phone tree options selected by the customer when placing the call. In another embodiment, transcripts may be reviewed manually, and a user may tag the transcripts at customer complaints database 208 via tagging component 210 by selecting from topics to categorize the transcript.

The tagged transcripts in customer complaints database 208 are then used for training by customer complaints model training component 212. The known tags applied to each transcript can be used in a supervised learning application to train a customer complaints ML model to properly identify tags that should be applied to a given transcript.

Figure 3:
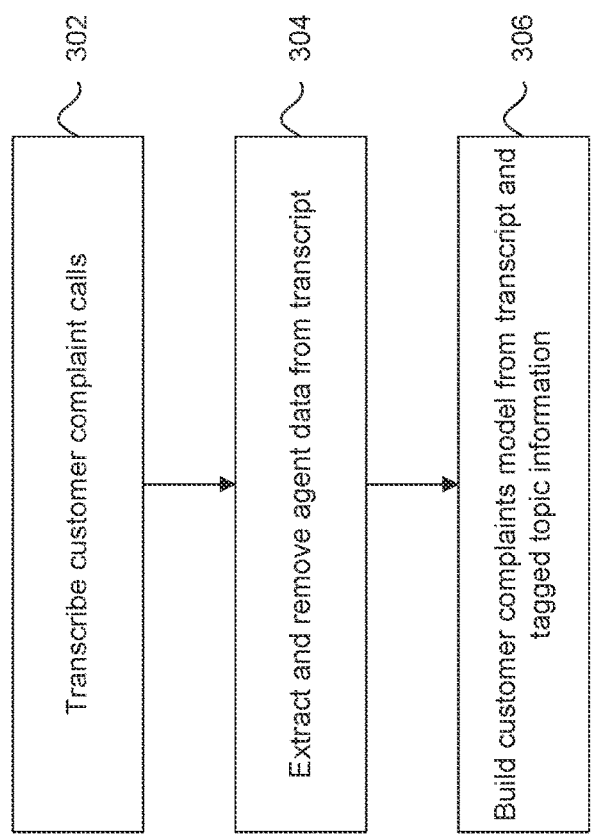
FIG. 3 is a flowchart illustrating steps for building a customer complaints model, in accordance with an embodiment.

FIG. 3 is a flowchart 300 illustrating steps for building a customer complaints model, in accordance with an embodiment. The process begins at step 302 where a customer complaint call is transcribed, in accordance with an embodiment. In the case of a chat, a log of the chat is used as the transcript. In the case of a voice call, the call is first converted using text-to-speech approaches, and the resulting text is used as the transcript. One skilled in the relevant arts will appreciate that other approaches may be applied to customer communications and the generation of transcripts therefrom.

At step 304, the transcript is parsed to remove communications apart from those of the customer—e.g., anything spoken or written by an agent communicating with the customer. And at step 306, the resulting transcript, which has been tagged with corresponding topics, is used to build and train a customer complaints model.

Figure 4:
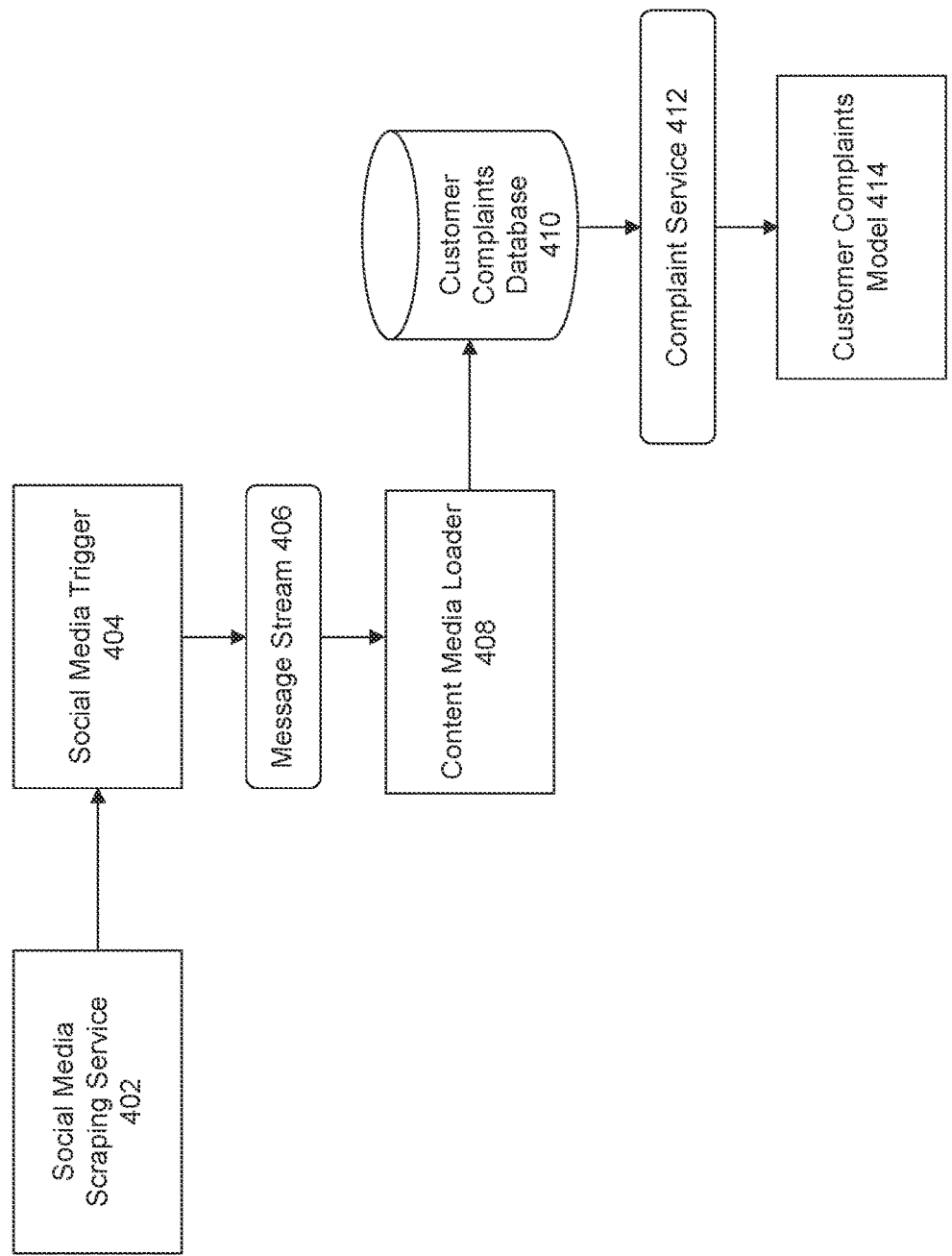
FIG. 4 is a diagram illustrating a cognitive analysis system, in accordance with an embodiment.

FIG. 4 is a diagram illustrating a cognitive analysis system 400, in accordance with an embodiment. Cognitive analysis system 400 includes a social media scraping service 402, in accordance with an embodiment. Social media scraping service 402 is configured to connect to social media platforms to be scraped, and retrieve postings made on those social media platforms. In accordance with an embodiment, social media scraping service 402 is configured to connect to a given social media platform using an application programming interface (API) associated with the given social media platform. Social media scraping service 402 may be provided, by way of non-limiting embodiment, by a third party vendor, and configured to provide relevant posts referencing a given company as a result. By way of example, and not limitation, examples of third party vendors of social media scraping service 402 include Hootsuite and Awario.

Social media trigger 404 is configured to provide social media posts obtained by social media scraping service 402 that meet certain filter requirements, in accordance with an embodiment. In particular, as mentioned above, social media trigger provides, as a message stream 406, those social media posts that are relevant to a particular business based on the filter requirements (e.g., the business name is mentioned somewhere in the social media post).

Content media loader 408 is configured to retrieve these relevant social media posts and prepare them for storage into customer complaints database 410. In accordance with an embodiment, customer complaints database 410 corresponds to customer complaints database 208 in FIG. 2 used for storing transcripts of chat or voice calls. Accordingly, content media loader 408 may convert the social media posts into a "transcript" as well, for storage alongside the voice and chat transcripts held in customer complaints database. For example, a negative post on a social media platform such as Facebook or LinkedIn can be stored in in customer complaints database 410.

Complaint service 412 is configured to interface with customer complaints model 414 (which has been trained using the existing transcript and tag data in customer complaints database 410) and the transcript data (including social media posts) held in customer complaints database 410. Complaint service 412 can provide an uncategorized transcript to customer complaints model 414, and receive a response tag according to a topic associated with a customer complaint within the transcript. Complaint service 412 can then store the tag together with the transcript in customer complaints database 410.

Figure 5:
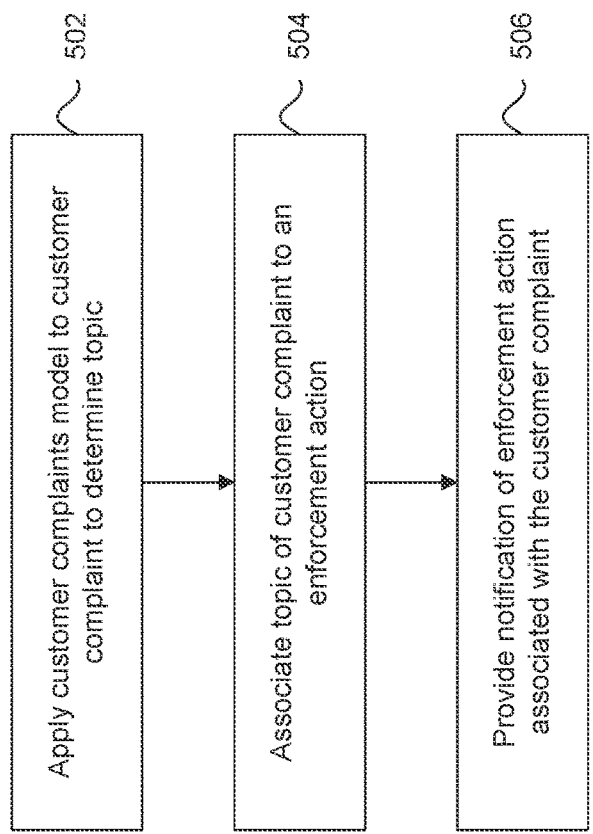
FIG. 5 is a flowchart illustrating steps for applying the customer complaints model to customer complaints, in accordance with an embodiment.

FIG. 5 is a flowchart 500 illustrating steps for applying the customer complaints model to customer complaints, in accordance with an embodiment. At step 502, the customer complaints model is executed against a customer complaint (e.g., a social media post) to determine a topic based on the trained call and/or chat transcripts and tags. At step 504, a topic associated with the customer complaint is determined. By way of non-limiting example, the topic is based on topics trained in the customer complaint model from the original tagged training data, and can reference a regulatory mandate or sub-mandate (e.g., Fair Credit Reporting Act). A regulatory mandate or sub-mandate is, in turn, associated with one or more regulatory requirements. One skilled in the relevant arts will appreciate that other mappings between topics and regulatory requirements is contemplated within the scope of this disclosure, as captured in the tagged training data.

Based on the determined topic, one of more enforcement actions may be obtained, and notification of these enforcement actions provided at step 506. These notifications can be directed to one or more employees of a business. Businesses in many industries need to deal with emerging risks of possible enforcement actions. For example, businesses in the heavily-regulated banking industry must be aware of possible regulatory violations they may have committed, and the possible risks from those violations based on the enforcement actions.

An employee of a business responsible for tracking risks related to a particular topic may register (i.e., subscribe) for notifications for that topic. For example, in the case of a bank, an attorney for the bank may register for notifications of enforcement actions that are associated with topics for which there is a customer complaint. That registered subscriber to notifications for the topic can then be provided with a copy or link to an enforcement document related to the customer complaint in a notification. An enforcement document is, by way of non-limiting example, a document detailing a particular enforcement action taken by a government agency. Some non-limiting examples of enforcement documents include cease and desist orders, consent orders, formal agreements, securities enforcement actions, and complaints.

Figure 6:
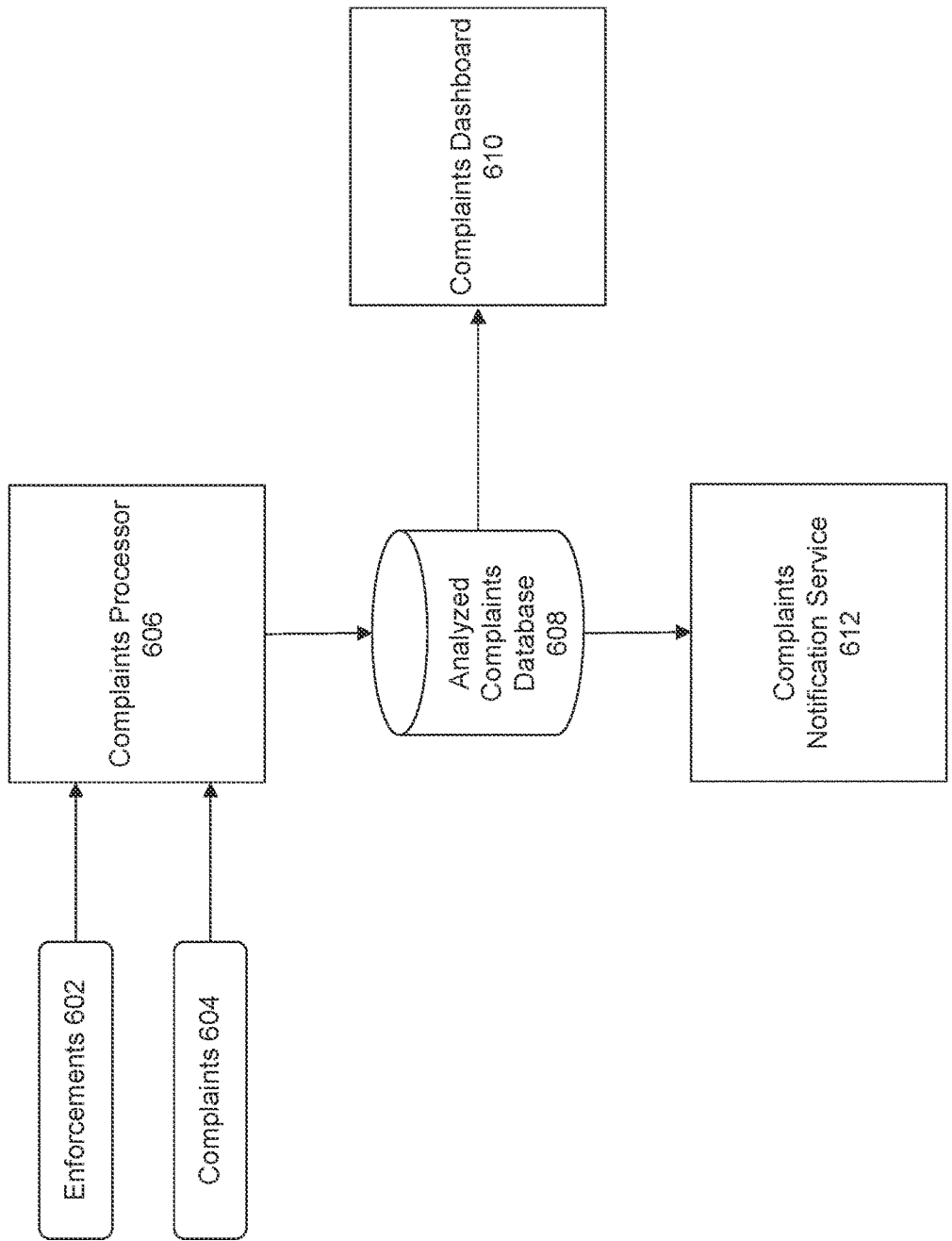
FIG. 6 illustrates a complaints notification system, in accordance with an embodiment.

FIG. 6 illustrates a complaints notification system 600, in accordance with an embodiment. Complaints processor 606 receives enforcement actions (e.g., in an enforcement document) associated with a particular topic, and complaints 604 that are also associated with a particular topic per the processes detailed herein. Enforcement actions provided as enforcements 602 may be tagged according to topic by classification approaches, such as those detailed in "COMPLIANCE MANAGEMENT FOR EMERGING RISKS", application Ser. No. 16/536,678, filed Aug. 9, 2019, incorporated herein by reference in its entirety.

Complaints processor 606 is configured to store enforcements 602 and complaints 604 in an analyzed complaints database 608, in accordance with an embodiment. In an embodiment, enforcements 602 and complaints 604 are related within analyzed complaints database 608 by common topics. These relationships can be viewed, monitored, and modified as needed via a user interface, such as complaints dashboard 610. And complaints notification service 612 allows a user to register for notifications, and receive those notifications, for a given topic whenever an enforcement 602 is received that matches a complaint 604 by the topic.

Figure 7:
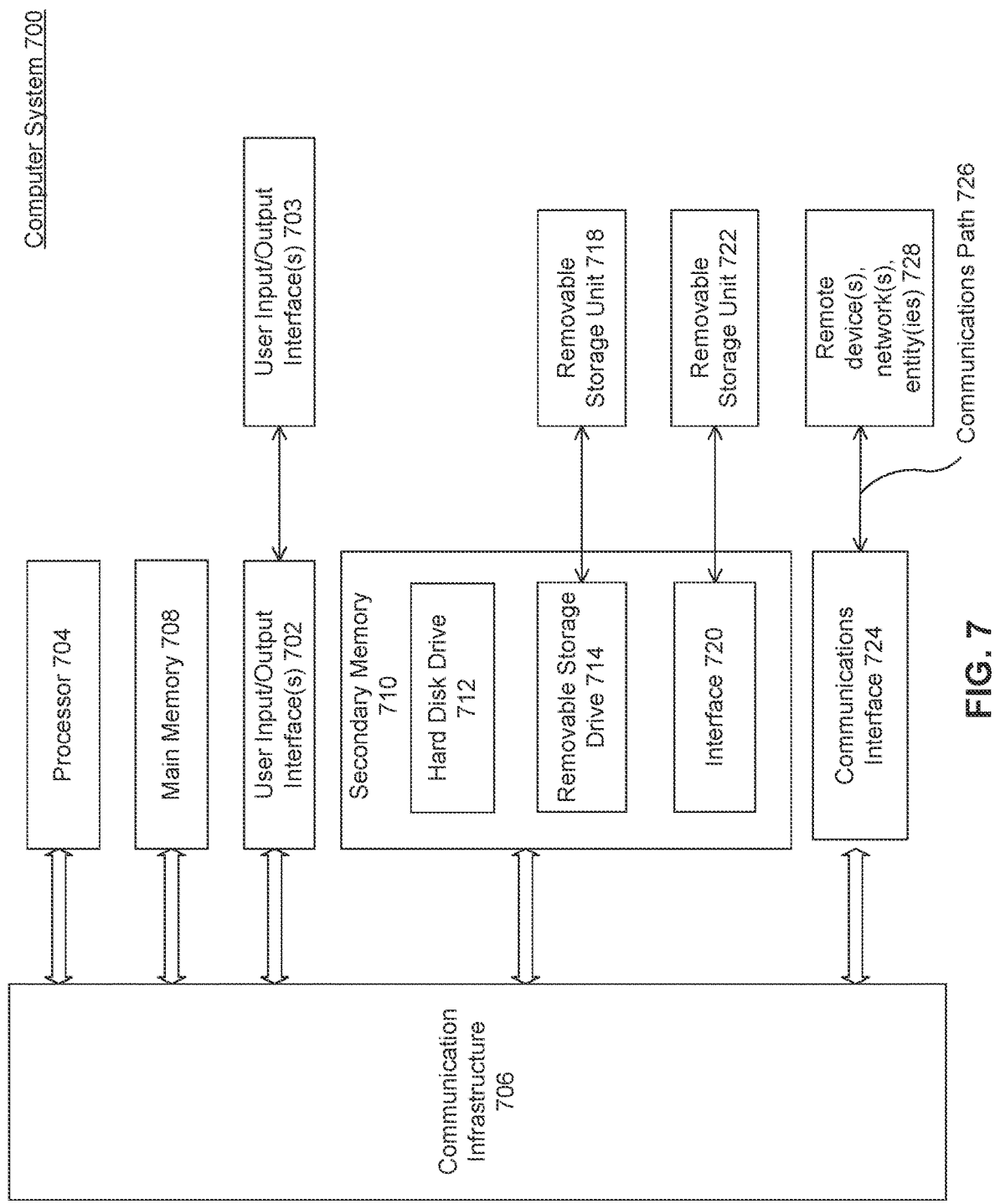
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   filtering, by one or more computing devices, a plurality of social media messages received from a social media scraping service based on a company name mentioned within the social media message, the filtering generating a stream of company specific social media messages, wherein the social media scraping service is configured to connect to a plurality of social media platforms to be scraped;
   storing, by a content media loader, the stream of company specific social media messages as transcripts into a customer complaints database;
   executing, by the one or more computing devices, a trained complaints model on the transcripts of the company specific social media messages to identify a topic associated with the company specific social media messages; and
   notifying, by the one or more computing devices, a subscriber associated with the topic associated with the company specific social media messages of an enforcement action associated with the topic that is associated with the company specific social media messages.

2. The computer-implemented method of claim 1, wherein the trained complaints model is trained using customer complaint data tagged with associated topics through supervised machine learning.

3. The computer-implemented method of claim 2, wherein the customer complaint data further comprises any of: customer chat messages or customer voice calls.

4. The computer-implemented method of claim 1, wherein the enforcement action references a regulatory mandate or sub-mandate associated with one or more regulatory requirements.

5. The computer-implemented method of claim 1, further comprising:
   relating the enforcement action to the company specific social media messages by common topics.

6. The computer-implemented method of claim 1, further comprising:
   requesting a complaint service to provide an uncategorized transcript to the trained complaints model and receiving a response tag according to a topic associated with a customer complaint within the uncategorized transcript.

7. The computer-implemented method of claim 1, wherein the filtering comprises tagging the company in the social media message using a social media handle associated with the company.

8. A system comprising:
a memory configured to store operations; and
one or more processors configured to perform the operations, the operations comprising:
    filtering, by one or more computing devices, a plurality of social media messages received from a social media scraping service based on a company name mentioned within the social media message, the filtering generating a stream of company specific social media messages wherein the social media scraping service is configured to connect to a plurality of social media platforms to be scraped;
    storing, by a content media loader, the stream of company specific social media messages as transcripts into a customer complaints database;
    executing, by the one or more computing devices, a trained complaints model on the transcripts of the company specific social media messages to identify a topic associated with the company specific social media messages; and
    notifying, by the one or more computing devices, a subscriber associated with the topic associated with the company specific social media messages of an enforcement action associated with the topic that is associated with the company specific social media messages.

9. The system of claim 8, wherein the trained complaints model is trained using customer complaint data tagged with associated topics through supervised machine learning.

10. The system of claim 9, wherein the customer complaint data further comprises any of: customer chat messages or customer voice calls.

11. The system of claim 8, wherein the enforcement action references a regulatory mandate or sub-mandate associated with one or more regulatory requirements.

12. The system of claim 8, the operations further comprising:
    relating the enforcement action to the company specific social media messages by common topics.

13. The system of claim 8, wherein the executing the trained complaints model further comprising: requesting a complaint service to provide an uncategorized transcript to the trained complaints model and receiving a response tag according to the topic associated with a customer complaint within the uncategorized transcript.

14. The system of claim 8, the system further comprising:
    a complaints notification service allowing a user to register for notifications, and receive those notifications for a given topic, whenever the enforcement action is received that matches a complaint by the topic.

15. A computer readable storage device having instructions stored thereon, execution of which, by one or more processing devices, causes the one or more processing devices to perform operations comprising:
    filtering, by one or more computing devices, a plurality of social media messages received from a social media scraping service based on a company name mentioned within the social media message, the filtering generating a stream of company specific social media messages, wherein the social media scraping service is configured to connect to a plurality of social media platforms to be scraped;
    storing, by a content media loader, the stream of company specific social media messages as transcripts into a customer complaints database;
    executing, by the one or more computing devices, a trained complaints model on the transcripts of the company specific social media messages to identify a topic associated with the company specific social media messages; and
    notifying, by the one or more computing devices, a subscriber associated with the topic associated with the company specific social media messages of an enforcement action associated with the topic that is associated with the company specific social media messages.

16. The computer readable storage device of claim 15, the operations further comprising: requesting a complaint service to provide an uncategorized transcript to the trained complaints model and receive a response tag according to the topic associated with a customer complaint within the uncategorized transcript.

17. The computer readable storage device of claim 15, the operations further comprising: relating the enforcement action to the company specific social media messages by common topics.

18. The computer readable storage device of claim 15, wherein the enforcement action references a regulatory mandate or sub-mandate associated with one or more regulatory requirements.

\* \* \* \* \*